United States Patent [19]

Hagen

[11] Patent Number: 4,617,826
[45] Date of Patent: Oct. 21, 1986

[54] TEST SYSTEM FOR AIR DATA SENSOR

[75] Inventor: Floyd W. Hagen, Eden Prairie, Minn.

[73] Assignee: Rosemount Inc., Eden Prairie, Minn.

[21] Appl. No.: 595,244

[22] Filed: Mar. 30, 1984

[51] Int. Cl.$^4$ .......................... G01L 27/00; G01L 7/00
[52] U.S. Cl. .................................. 73/182; 73/861.65; 73/4 R; 73/37
[58] Field of Search ................ 73/37, 40, 3, 4 R, 182, 73/183, 861.65, 861.66, 861.67, 861.68

[56] References Cited

U.S. PATENT DOCUMENTS

| | | | |
|---|---|---|---|
| 3,089,331 | 5/1963 | Sharko | 73/4 R |
| 3,946,595 | 3/1976 | Carlson | 73/37 |
| 4,182,158 | 1/1980 | Culotta | 73/4 R X |

FOREIGN PATENT DOCUMENTS 1817246  8/1969  Fed. Rep. of Germany .......... 73/40

Primary Examiner—Kenneth M. Schor
Attorney, Agent, or Firm—Kinney & Lange

[57] ABSTRACT

A test system for air data sensors includes means for mounting the system components directly on the sensor and provides a self contained source of the necessary vacuum or positive pressure as needed for testing the sensor for function. The self contained test system includes manual pressure creating means that is self limiting to prevent excessive pressures being generated. In one form of the invention the entire assembly slips over and is supported on a sensor probe, and includes passageways and connections to provide the fluid pressures required to the sensing ports. In a second form, the self contained test system mounts on the sensor strut and has a pressure fitting that fits over the ends of a probe barrel to provide an adjacent coupling means for supplying the fluid pressures to the respective ports. The test system is a compact, easily mounted unit that is supported directly on the air data sensor being tested, and which has self contained fluid pressure sources for the necessary test. It is easy to use with minimal training of the operators, compact, and does not require any electrical power nor any other power supply.

2 Claims, 8 Drawing Figures

TEST SYSTEM FOR AIR DATA SENSOR

BACKGROUND OF THE INVENTION

1. Field of the Invention

The present invention relates to self contained pressure test systems for air data sensors that mount directly on the sensor tested.

2. Description of the Prior Art

It has long been desired to have a simple test system for determining whether or not an air data sensor and its connected instruments are operable. On high performance aircraft air data sensor information is necessary for operation of the aircraft, and for providing information to on-board computers of the aircraft. In the case of vehicles such as tanks, air data sensors comprise cross wind sensing apparatus to provide information to the fire control systems, and thus inoperability of such cross wind sensors reduces the usefulness of the tank.

U.S. Pat. No. 3,518,870 shows a testing adapter for aircraft pitot-static tubes which includes a pressure and vacuum source box 8 that is "remotely located" from the test head or adapter mounted on the probe. The test head provides passageways leading to individual ports on the pitot-static tube. The remotely located pressure and vacuum sources need power, and the units now in use comprise large carts that are rolled out adjacent to the airplane or vehicle. The conventional adapters are then fitted in place and auxiliary power used to power pumps for providing the vacuum and pressure sources.

U.S. Pat. No. 4,384,469 also shows a pitot-static tube tester system that relates to an adapter that slips over the end of a pitot-static tube. It should be noted that separate, and remotely located sources of pitot pressure, which is the positive fluid pressure, and static pressure, which is a negative pressure relative to pitot pressure, are again provided. No details of the construction of the sources are provided.

Additionally, a check out device for air data sensors is shown in U.S. Pat. No. 3,385,095. This is merely a hand held device to see that the ports are not blocked and provides a fan flow to the ports of the probe. It requires electrical power to operate.

SUMMARY OF THE INVENTION

A test system used for determining functionality of air data sensors, such as pitot-static tubes for air vehicles or cross wind sensors for tanks, is a self contained, mechanically operated system that mounts directly on the sensor. The system is simple enough so that it does not require extensive training to use. The system is difficult to misuse, and the pressure generating means that is provided with the system is a self contained unit that is fail safe in that it will not generate excessive pressures that will cause damage to the system.

Air data sensors that will sense pitot pressure and static pressure, as well as pressures for determining angle of attack and/or side slip, are well known for use on aircraft, and in particular high performance aircraft. Operability of such sensors is essential to safe flying. Operability of the electrical readout systems and determination of accuracy, within limits, is made by comparison of readings on the test set and the normal readout instruments. Rapidly completed checks for insuring that the sensors and connecting systems are functioning, that is insuring they have the correct outputs and are not plugged or leaking, is important before use.

Additionally, in vehicles such as tanks, where the fire control system for the armament depends upon sensing the wind conditions, it is important to insure that the cross wind sensor probes normally used with tanks are not leaking or plugged with dirt or sand.

At present the check out devices for determining functionality of such air data sensors are large and cumbersome, and generally require a power cart or external power supply in addition to a substantial amount of tubing, indicators, and the like.

The present device is a self contained unit that is easily mounted directly on the sensor, and includes a manually operable pressure generator that will provide the necessary pressures to determine if the system is plugged or has leaks, and also is capable of being safely operated with little training or instruction.

In the case of functional testing air data sensors such as pitot-static tubes, it is important that the static pressure ports and connectors be subjected to a pressure that is less than atmospheric, and the pitot pressure port and connectors be subjected to a pressure that is greater than atmospheric. In the form of the invention shown for checking operability of pitot-static tubes, the pressure generator includes means for generating positive pressure as well as a pressure less than atmospheric.

The units are simple to use, simple to construct and are relatively foolproof because they do not generate excessive pressures that might cause system damage.

DETAILED DESCRIPTION OF THE PREFERRED EMBODIMENTS

Figure 1:
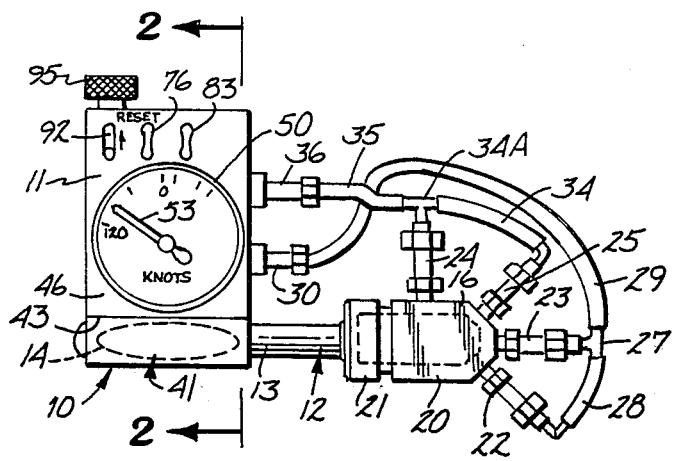
FIG. 1 is a side elevational view of an air data sensing probe having a test system of the present invention installed for use.

Referring to FIG. 1, a test system indicated generally at 10 is designed specifically for use with air data sensors mounted on an aircraft such as pitot-static, angle of attack, and angle of sideslip sensors. In the first form of the invention, both positive, or pitot pressures, and negative, or static pressures, are generated with a provided pressure generating means.

The system includes a main frame or housing 11, and it is adapted to be supported on a portion of an air data sensor 12. The air data sensor 12 includes a barrel or probe portion 13, and in this form of the invention a strut 14 is used for mounting the probe barrel in position on the side of an aircraft.

A typical air data sensing probe with which the present device is used is such as that shown in U.S. Pat. No.

3,318,146. The probe has a hemispherical end 16 and a center (axial) port for sensing pitot pressure, and additional ports offset at angles to the longitudinal axis for determining angle of attack and angle of side slip. In the form shown, the test system is set up to test the pitot port, angle of attack ports, and also separate static pressure ports on the outer surface of the barrel. It is to be understood that the present device can be used with different types of test adapter heads, indicated generally at 20, which fit over the end of the probe or barrel to provide either pitot or static pressures to selected ports on the probe. The previously mentioned devices in the prior art section of this specification show heads that use seals for isolating the pitot (positive pressure) and static pressure ports from each other.

The adapter head 20 is mounted onto the probe 13 in a suitable position, and has a compression nut 21 for holding it securely in position. The adapter head 20 also has interior seals (not shown) to isolate the ports opening to positive (pitot) pressure connectors 22 and 23, and static pressure connectors 24 and 25. Connector 22 is connected to a port called a $P_{\alpha 1}$, port (positive pressure angle of attack port) and connector 23 is connected to the pitot pressure port, called a $P_3$ port. Connector 24 is connected to a static sensing port, called a $P_s$ port and connector 25 is connected to a negative pressure angle of attack port called a $P_{\alpha 2}$ port. Again, it is to be understood that the construction of the adapter head 20 is conventional, and that selection of the ports to be subjected to static or pitot pressures, respectively, can be made as desired.

A "T" connection 27 is used for connecting a tube 28 to an output tube 29 for pitot pressure which is connected to a pitot pressure output fitting 30 and to the fittings 22 and 23. These two fittings are connected together in parallel and are subjected to the same pressure.

A "T" connector 34A is provided for connecting fitting 24 to a tube 34 and to a tube 35 leading to a static pressure output connector 36. The fitting 25 is connected to tube 34. The fittings 24 and 25 are thus plumbed together in parallel and each are subjected to the same pressure. The fittings or connectors 30 and 36 are mounted on the housing 11.

Figure 3:
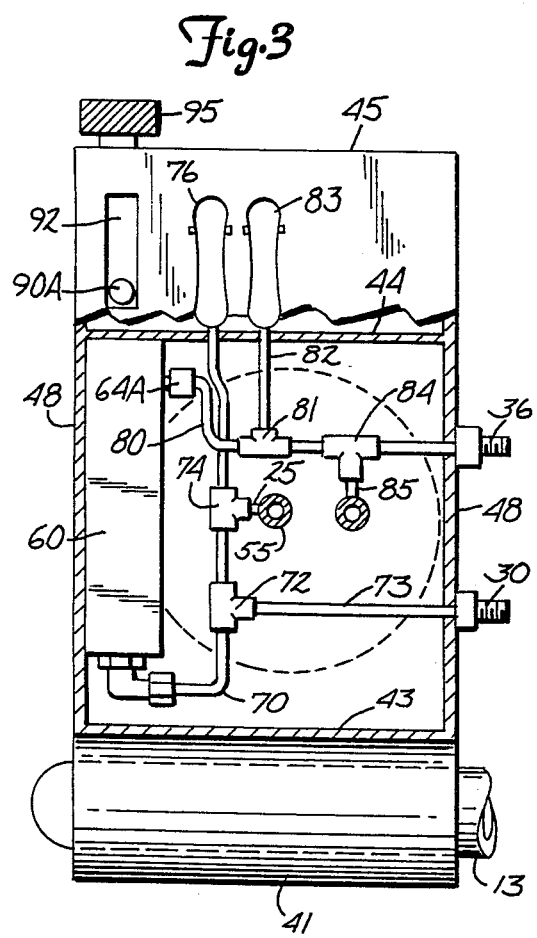
FIG. 3 is a front view of the housing of the test system with parts in section and parts broken away.
Figure 2:
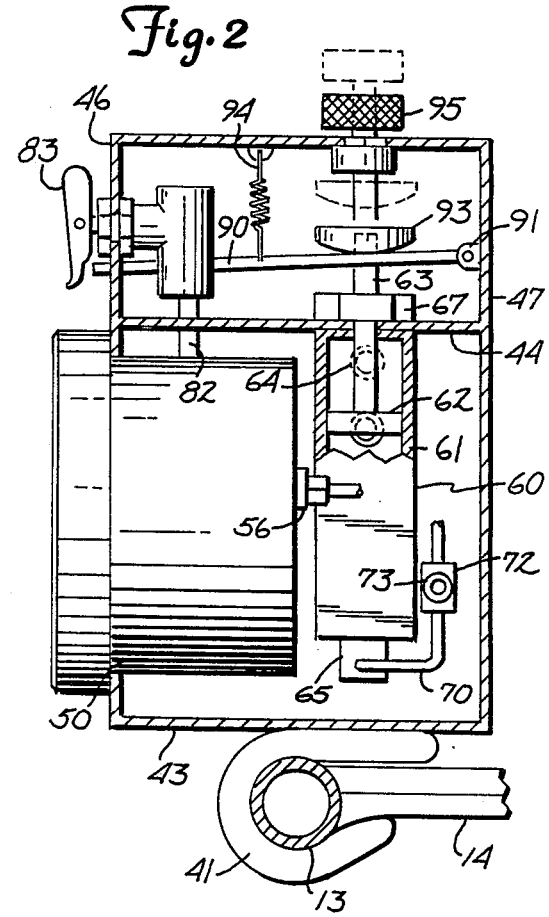
FIG. 2 is a sectional view taken as on line 2—2 in FIG. 1.
Figure 4:
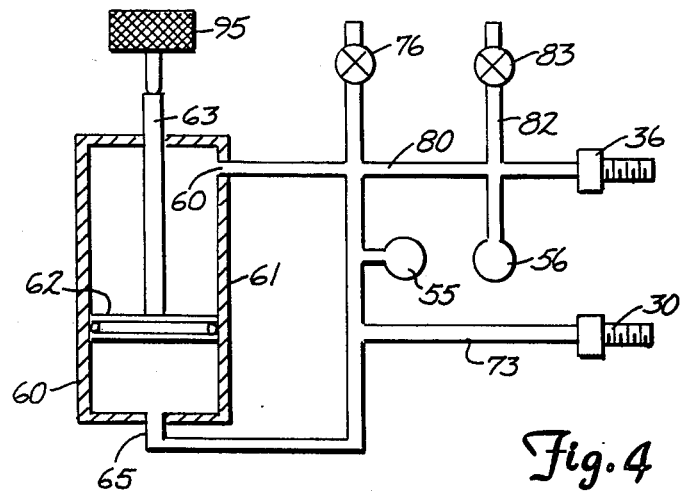
FIG. 4 is a schematic representation of the pressure lines and pressure generating source contained within the housing of FIG. 1.

The housing 11 has a "C" shaped attachment fitting 41 attached to a bottom wall 43 and the fitting 41 will slip over the probe. The opening of the "C" permits sliding the housing into position over the strut 14 from the rear. Referring to FIG. 2, the strut 14 is shown in section. The housing is broken away to show details in FIGS. 2 and 3, and the housing has the bottom wall 43, a center horizontal divider wall 44, and a top wall 45. Additionally it has a front wall or panel 46, and a rear wall 47. Suitable side walls 48 are also provided.

A conventional airspeed indicator indicated at 50 is suitably mounted in the front side of the housing. The airspeed indicator is a relatively low speed (10 to 150 knot) airspeed indicator and is a pressure sensor in that the indicator needle shown in FIG. 1 at 53 will deflect in response to differentials between the pressure at a pitot or positive pressure input connector 55, and a negative or static pressure connector 56. The static pressure connector 56 is connected to the aircraft static system in use, and the pitot pressure connector 55 is connected to the normal pitot pressure connection when the indicator 50 is in normal use.

In order to generate pitot and static pressures, pressure generating means indicating generally at 60 is provided. It comprises a piston-cylinder assembly including an outer cylinder 61, and an internal piston 62 that moves with a rod 63 along the length of the cylinder. The static pressure outlet port indicated at 64 is at the upper end of the cylinder 61 as shown, and the positive pressure, or pitot pressure output connection or port 65 is at the bottom end of the cylinder 61 as shown in FIG. 2.

The cylinder 61 is supported on the intermediate wall 44 of the housing with a suitable nut 67 threaded onto a collar. The upper end of the rod 63 extends through the nut, as shown. It can be seen that movement of the piston 62 in the cylinder 61 will cause differential in pressure at the ports 64 and 65, and downward movement of the piston 62 will cause positive pressure to be present at the port or fitting 65, while negative pressure is present at the port 64. The port or fitting 65 is coupled through a tube 70 to a T connector 72 leading to a tube 73 that is in turn connected to the output fitting 30, and through the fitting 30 to the tube 29. The line or tube 70 also has a second T connector 74 which connects to a tube 75 leading to the pitot pressure connector 55 of the airspeed indicator 50. The tube 70 extends to the upper portion of the housing 11, and is closed with a manually actuable toggle valve 76 that will either close the end of the tube 70 or open it to atmosphere. This toggle valve 76 is of conventional design, and has an external manually actuable lever operable so that the pitot pressure carrying tubes can be bled to atmosphere by raising the toggle lever and opening the valve.

The static pressure port 64 is connected to a fitting 64A that leads to a tube 80 that has a first T connector 81 installed in it. A tube section 82 leads from the T connector 81 to a second externally mounted and actuable toggle valve 83 that is also mounted on the housing and has a lever that can be flipped to open or close the valve and thus open the interior of the tubes 80 and 82 to atmosphere. The tube 80 has a second T connector 84 that connects through a tube 85 to the static pressure fitting or connector 56 for the airspeed indicator 50. Tube 80 then extends out to the side wall of the housing and is connected to the static pressure connector or fitting 36 that in turn is connected to the tube 35.

The actuation of the piston 62 is manual in the present device, and the rod 63, as shown, passes through an opening in a pivoting lever 90 that is pivotally mounted as at 91 to suitable brackets on one side wall of the housing 11 and extends outwardly through a slot 92 on the opposite side wall. A nut 93 is threadably mounted onto the end of the piston rod 63, and has a rounded lower surface that bears against the upper side of the lever 90.

A light spring 94 is connected to the top wall 45 of the housing and the lever 90 to spring load the lever 90 to its up position. Lifting the lever 90, at its outer end indicated at 90A on the outside of the housing 11 will push on the nut 93 to pull the piston rod 63 upwardly and in turn pull the piston 62 up to its reset position. However, assuming that the unit is in its reset position as shown in FIG. 2, the movement of the piston 62 and rod 63 downwardly to create positive pressure at fitting 65 and a partial vacuum or negative pressure at port 64 is accomplished by threading a pressure control screw indicated generally at 95 that is threadably mounted in a suitable manner to the upper wall 45 of the housing. The screw 95 has an end surface that bears down on the end of the piston rod as shown. By turning the screw 95, the piston 62 will be moved downwardly and the piston thus will create a positive pressure in line 70, and a negative pressure (relative to atmosphere) in the line 80, causing the needle on the airspeed indicator 50 to move in response to, and as a function of the differential in pressure.

Because the volume in the tubes is quite low, and there is not any flow, the pressure will be built up sufficiently to get a satisfactory indication with the needle 53, and by watching the needle over a time period, it can be determined whether or not any leakage occurs. Usually the needle is advanced to a set point, such as 140 knots which is nearly full scale, to provide adequate pressure for a satisfactory check of the system for operability of the electrical readout systems by comparing the readings of instrument 50 and of the aircraft instruments. The amount of movement of the screw 95 is limited to be less than the stroke of piston 62 to insure that excessive pressure will not be applied to the system being tested.

The test system also will provide static pressure only. If the bleed valve 76 is opened, and the piston is lowered by operating the member 95, only static (negative) pressure will be provided. If the valve 83 is opened and valve 76 closed, as the piston is moved down, positive pressure will be generated in the line 70.

If both of the bleed valves 76 and 83 are closed, then static and pitot pressure will simultaneously be provided to angle sensing ports and in this way provide a measurement of operability of the electrical readout system and of angle of attack indicators in the aircraft as well as a determination of whether the output is within tolerances.

It is important that both valves 76 and 83 be opened to atmosphere when the piston 62 is being raised with lever 90, to avoid damage to the instruments by creating a negative pressure on the pitot side of the system, as well as a positive pressure on the static side of the system.

The reset lever 90 is used for raising the piston, and reset sequence is to open valves 76 and 83, raise screw 95, and then raise the lever 90 to reset the piston 62.

Again, a very simple test system device is provided for mounting directly onto a strut mounted probe, and a self contained, fail safe pressure and vacuum generating means is provided.

SECOND EMBODIMENT OF THE INVENTION

Figure 5:
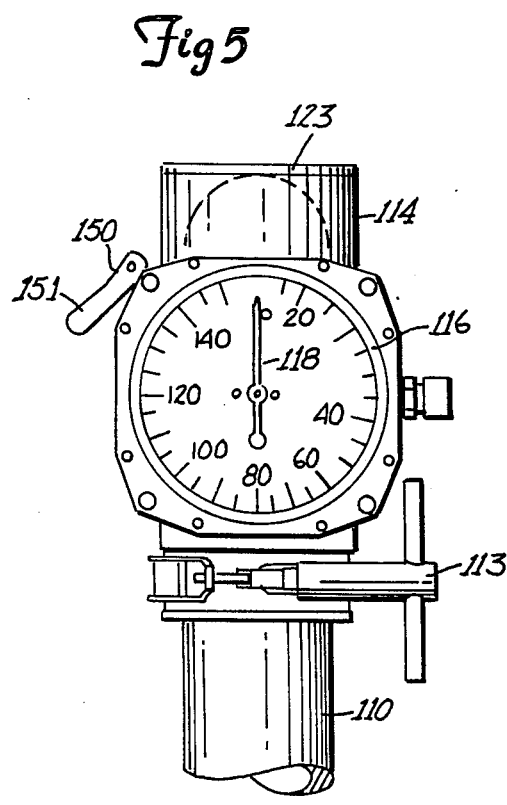
FIG. 5 is a front elevational view of a second form of the present invention used with a cross wind sensor probe.

The second embodiment of the present invention is illustrated in FIGS. 5 through 8. In this embodiment, the test system is for use on a cross wind sensing probe of the type commonly used on tanks for providing wind velocity and direction indications, for the fire control systems for the tank armament. Referring to FIG. 5, a probe or barrel indicated generally at 110 is of cylindrical construction and generally extends uprightly. The probe barrel has cross wind sensing ports, and a cross wind sensor of conventional design is illustrated in U.S. Pat. No. 3,646,811. Generally speaking the probe or barrel has orthogonally located ports, and the interior will be divided into four separate chambers. The present test system will test one port of one chamber at a time, and the test system can be rotated if desired to test different ports on the probe.

Figure 7:
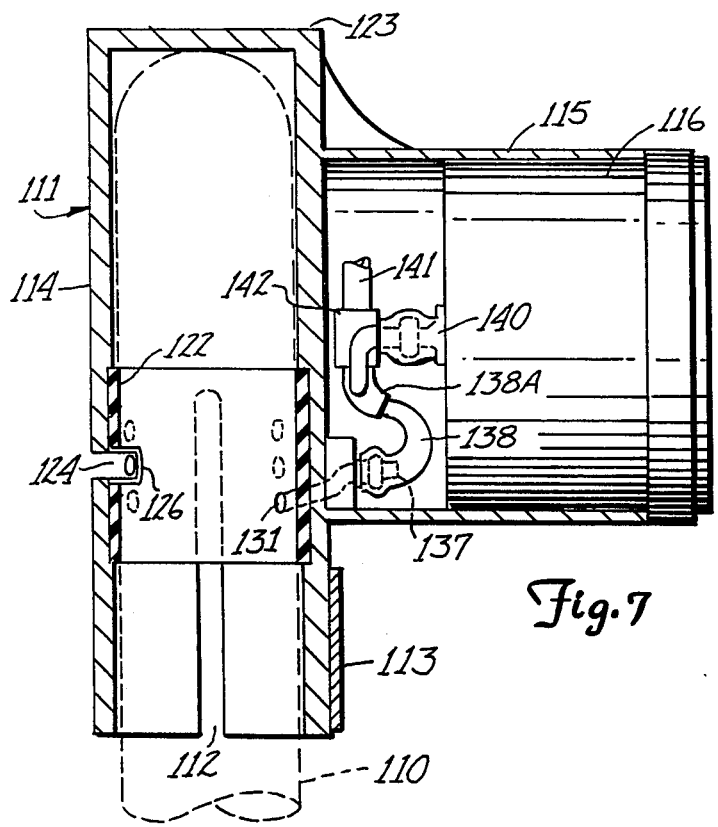
FIG. 7 is a sectional view taken generally along 7—7 in FIG. 6.

The test system of the second embodiment also includes a mounting housing 111, which has a main section 114 with a central bore that receives the probe or barrel 110, and the main section has a plurality of longitudinal slits shown at 112 so that it will fit over the probe barrel 110 and can be tightened down with a suitable clamp indicated at 113, if desired. The housing 111 has a laterally facing section 115 attached to the main housing section 114. The lateral housing section 115 supports an airspeed indicator shown at 116, of conventional design and of substantially the same type as shown in the prior form of the invention. Referring specifically to FIG. 7, the airspeed indicator 116 is shorter than the interior chamber of the housing section 115, and the rear surface of the airspeed indicator body indicated at 117 defines a static pressure chamber 120 which is at atmospheric pressure.

Figure 6:
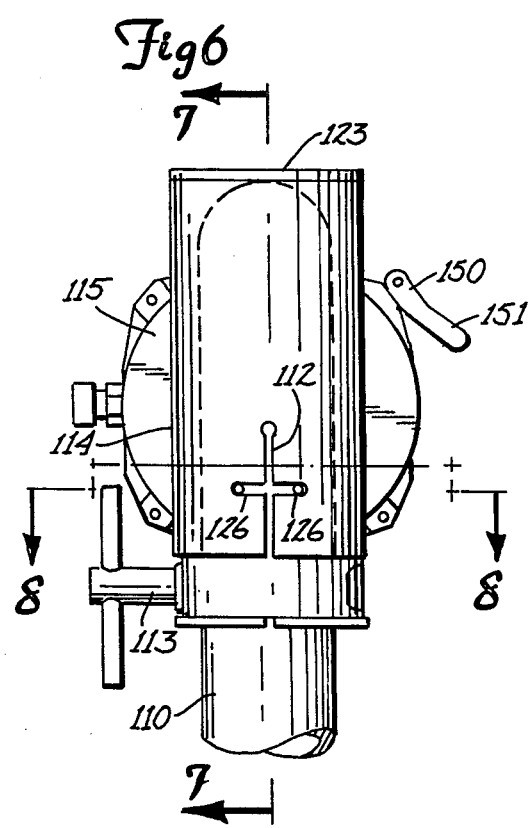
FIG. 6 is a rear elevational view of the device of FIG. 5.
Figure 8:
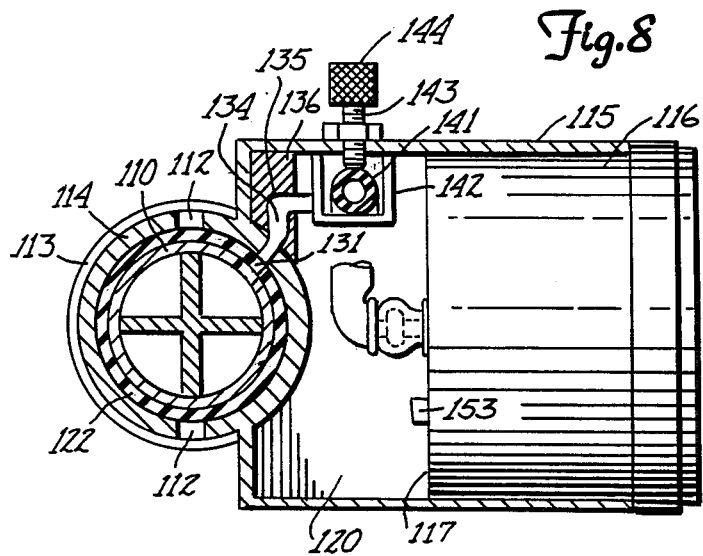
FIG. 8 is a sectional view of a pressurization valve used with the system for generating pressure in the system and taken on line 8—8 in FIG. 6.

The interior of housing section 114, as shown in FIG. 7 has an annular resilient sleeve 122 comprising a fluid pressure seal that is positioned in a suitable recess on the interior of the housing main section 114. The section 114 has a top cap 123 so that when the housing is fitted down over the air data sensing probe or barrel 110, a part annular slot 124 in the housing section 114 is at a level that aligns with provided ports 126 in the barrel or probe 110. In FIG. 6, the axes of the ports 126 are shown at 90° angles to each other, and the two ports 126 are visible through part annular slot 124 near the ends of the slot to indicate that the main housing section 114 is properly positioned rotationally, and a single port or passageway 130 in the housing section 114 is then aligned with a port 131 in the seal member 122. When the housing section 114 is positioned as shown in FIGS. 6, 7, and 8, the port 131 in the seal will align with the port 131 in the probe 110, which opens into one of the chambers in the probe which is to be tested for operability. The seal member closes off the other ports in the internal chamber into which port 130 opens. The ports 126 are open to atmosphere so differentials in pressure are sensed.

As shown in FIG. 8 the probe 110 has walls dividing the interior into desired fluidly separated chambers. Ports in the probe wall are provided to each chamber and the axes of the ports for two chambers are on a first diametral plane and the axes of the ports for the other two chambers are on a second diametral plane 90° from the first plane. There generally are a plurality of ports for each chamber spaced in longitudinal direction of the probe as shown in dotted lines in FIG. 7.

The cylindrical main housing section 114 can be rotated about the axis of the probe 110 so that operability within desired limits under simulated wind from one side can be tested first by having the port 131 in the seal 122 aligning with a port on the probe opening to one chamber. Normally after one test, the housing section 114 will be rotated 180° to determine operability for reciprocal wind direction.

The port 131 aligns with a passageway or port 134 in the main housing section 114 which opens to a passageway 135 in a block 136 mounted on the interior of the static chamber 120 in housing portion 115. The passageway 135 has a fitting 137 at its outer end. A tube 138 is connected to this fitting, and this tube 138 is a fluid tight tube that has a T connector 138A so that one portion of the tube 138 is open to the pressure fitting indicated at 140 on the airspeed indicator. A flexible tube 141 is connected to the T connector 138A and also passes through a housing or block 142 that has an opening therethrough, and into which a screw 143 may be suitably threaded. The screw has a head 144 on the exterior of the housing section 115. A suitable threaded connector receives the screw so that when the screw is threaded toward the tube 141, the flexible tube 141 will be compressed along a portion of its length within the housing 142 and in this way generate an internal pressure as the tube compresses.

The outer end of the tube 141 extends upwardly, and is dead ended in a bleed valve 150 that has a toggle lever 151 for operation, and is either open or closed. This bleed valve 150 is used for bleeding to atmosphere the pressure generated by screw or pressure generating means 143.

The housing of the airspeed indicator 116 has a static pressure vent 153 which vents into the static pressure chamber 120 so that pressure generated in the tube 141 will cause the needle 118 on the airspeed indicator to move to a desired position under pressure.

The amount of compression of the tube 141 can be varied by having the size of the screw changed, or even using a small "shoe" or bearing member that bears against the tube along the length of the tube to insure that a sufficient volume is moved within the tube to create the necessary pressure to bring the airspeed indicator needle up to its desired level.

In a tight, closed fluid pressure sensor system, very little air has to be moved to create the necessary pressure. All of the tubes are short so the total volume of air is quite small and the percentage change in volume using the screw type pressure generating means is adequate to provide the necessary pressure.

In operation, the system can be bled by opening the valve 151 to atmosphere. After the main housing section 114 has been placed on the probe barrel 110, the valve 151 will be closed to seal the system and the pressure screw tightened down to pressurize the system. The pressure generated does not need to be as high as with aircraft sensors. By selecting a desired setting and reading the instruments inside the tank, operability and rough calibration can be checked.

In both forms of the invention, the sensing apparatus is mounted directly on the sensor to be tested, and includes mechanically operable pressure generating means that can be regulated relatively precisely to pressurize pitot-static, cross wind, and other air data sensing systems utilizing sensors, such as in meteorological sensing systems or in industrial uses, for operability checks (including the electrical readout circuits), and for determining if the indicators forming part of the system being tested are indicating within desired limits.

Although the present invention has been described with reference to preferred embodiments, workers skilled in the art will recognize that changes may be made in form and detail without departing from the spirit and scope of the invention.

What is claimed is:

1. A test system adapted to be used with a cylindrical probe having pressure sensing port means therein for sensing fluid pressures with ports being provided for sensing static pressure and ports being provided for sensing positive pressures, said test system including a housing, said housing being mounted on said probe to be tested, a cylinder and piston assembly mounted in said housing and having a piston rod extending to the exterior of said housing, a screw threadably mounted on said housing engaging said piston rod and threadable to move said piston rod in one direction relative to the cylinder, said piston thereby generating a positive pressure on one side of the piston, on the interior of said cylinder and a negative pressure on an opposite side thereof, connection means for separately connecting the interior portions of said cylinder on opposite sides of said piston at one side to a static pressure port and at the other side to a positive pressure port of the probe to be tested, respectively, bleed valve means in the means for connecting for bleeding each of the means for connecting to atmosphere, means independent of the screw for moving said piston rod in reverse direction from its movement caused by threading screw; and a pressure sensing indicator comprising an air speed indicator coupled for sensing differentials in pressure between the respective connection means for connecting the cylinder portion on opposite sides of the piston.

2. The apparatus as specified in claim 1 wherein said probe includes a mounting strut, and means for mounting said housing comprises a clamp member adapted to be mounted onto said mounting strut.

* * * * *